(12) United States Patent
Kim et al.

(10) Patent No.: US 12,479,934 B2
(45) Date of Patent: Nov. 25, 2025

(54) WATER RESPONSIVE SOFT ACTUATOR AND DRIVING METHOD THEREOF

(71) Applicant: POSTECH Research and Business Development Foundation, Pohang-si (KR)

(72) Inventors: Dong Sung Kim, Pohang-si (KR); Hyeon Seok Han, Pohang-si (KR); Andrew Choi, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 868 days.

(21) Appl. No.: 17/700,686

(22) Filed: Mar. 22, 2022

(65) Prior Publication Data

US 2022/0315678 A1    Oct. 6, 2022

(30) Foreign Application Priority Data

Apr. 2, 2021 (KR) .......................... 10-2021-0043595

(51) Int. Cl.
    *C08F 120/56*    (2006.01)
    *C08F 2/50*      (2006.01)
    *F03G 7/00*      (2006.01)
    *F03G 7/06*      (2006.01)

(52) U.S. Cl.
    CPC .............. *C08F 120/56* (2013.01); *C08F 2/50* (2013.01); *F03G 7/0612* (2021.08)

(58) Field of Classification Search
    CPC .. C08F 120/56; C08F 2/50; C08F 2/48; C08F 20/56; F03G 7/0612; C09D 133/26; B01J 13/0065; B25J 9/1095; C08J 3/24; C08L 33/26
    See application file for complete search history.

(56) References Cited

U.S. PATENT DOCUMENTS

2016/0033389 A1* 2/2016 Serpe ..................... G01N 5/025
                                                              73/29.01

FOREIGN PATENT DOCUMENTS

| JP | 2003039371 A | * | 2/2003 | |
| KR | 2017048852 A | * | 5/2017 | ............. A61K 47/32 |
| KR | 20200050552 | | 5/2020 | |

OTHER PUBLICATIONS

Translation of KR 2017-0048852. Lee et al. (Year: 2017).*
Zhe Fan Piao et al., "Syntheses and Swelling Behaviors of Poly(N-isopropylacrylamide-co-acrylonitrile) Hydrogels", 1 Polymer(Korea), vol. 31, No. 4, pp. 349-355, 2007.

* cited by examiner

*Primary Examiner* — K. Boyle
(74) *Attorney, Agent, or Firm* — LEX IP MEISTER, PLLC (57) ABSTRACT

The invention relates to a water responsive soft actuator using water responsive hydrogel whose volume hardly changes, and a method for driving the soft actuator. The water responsive soft actuator according to the invention includes polyisopropylacrylamide, and the polyisopropylacrylamide has an N-isopropylacrylamide monomer and water in a weight ratio of 87:13 to 95:5, wherein the water responsive soft actuator is driven by water absorption of the polyisopropylacrylamide.

11 Claims, 7 Drawing Sheets

WATER RESPONSIVE SOFT ACTUATOR AND DRIVING METHOD THEREOF

BACKGROUND OF THE INVENTION

1. Field of the Invention

The present invention relates to a water responsive soft actuator using water responsive hydrogel whose volume hardly changes, and a method for driving the soft actuator.

2. Description of the Related Art

The development of soft robotics provides the possibility to overcome many of the shortcomings of typical robots in a variety of application fields, including operation, movement, and human-machine interfaces.

Soft actuators, which are essential components of soft robots, may generate various operation patterns and motions to increase the resilience of typical robots to impacts and to drive the robots in a given environment.

In recent years, as smart materials responsive to water, electricity, heat, and chemicals are incorporated into soft actuators, self-operating soft actuators have been proposed. Among these, a water responsive soft actuator, which is driven based on a swelling/expansion mitigation process, has been attracting a lot of attention since it is operated in the least artificial environment.

However, water responsive soft actuators developed to date are manufactured based on hydrogel, and thus, have a low actuation force of about ~$10^{-2}$ N, and since they are driven based on a swelling/expansion mitigation process, the water responsive soft actuators have a slow actuation speed of about ~$10^{-2}$ s$^{-1}$. For this reason, typical water responsive soft actuators are limited in their actual application as soft robots despite their potential.

PRIOR ART DOCUMENT

Patent Document

Patent Laid-Open Publication No. 10-2020-0050552

SUMMARY OF THE INVENTION

An object of the present invention is to provide a water responsive soft actuator of a new concept capable of increasing the low driving force and slow driving speed of a typical water responsive soft actuator.

Another object of the present invention is to provide a method for driving the water responsive soft actuator.

According to an embodiment of the invention, there is provided a water responsive soft actuator including water-absorbable polyisopropylacrylamide, wherein the water responsive soft actuator is driven by water absorption of polyisopropylacrylamide.

According to another embodiment of the invention, there is provided a method for driving a water responsive soft actuator, the method including (a) crosslinking N-isopropylacrylamide to make an object of a first shape including polyisopropylacrylamide, (b) allowing water to be absorbed into the object of the first shape to allow the object of the first shape to be in an elastically deformable state, (c) applying external force to the object of the first shape in an elastically deformable state to deform the object of the first shape into an object of a second shape, (d) drying the object of the second shape, and (e) allowing water to be absorbed into the dried object of the second shape to allow driving in the first shape.

Advantageous Effects

A soft actuator according to the invention may increase the low rigidity of a typical water responsive soft actuator at a kPa level to the high rigidity at an MPa level, and may enable driving through a small amount of water absorption and release.

In addition, the soft actuator according to the invention may variously control an actuation force and an actuation speed by controlling the concentration a crosslinking agent and a thickness, and thus, the soft actuator may be widely used.

In addition, when the soft actuator according to the invention is applied to a soft robot, it may allow to significantly overcome practical limitations of a typical soft robot.

DETAILED DESCRIPTION OF THE EXEMPLARY EMBODIMENTS

Hereinafter, the configuration and operation of embodiments of the invention will be described with reference to the accompanying drawings. In the following description of the invention, when it is determined that detailed descriptions of related known functions or configurations may unnecessarily obscure the gist of the invention, the detailed descriptions will be omitted. In addition, when a portion is said to 'include' any component, it means that the portion may further include other components rather than excluding the other components unless otherwise stated.

A water responsive soft actuator according to the invention is characterized by including water-absorbable polyisopropylacrylamide, wherein the water responsive soft actuator is driven by water absorption of the polyisopropylacrylamide.

In addition, in the water responsive soft actuator according to the invention, the polyisopropylacrylamide is characterized by including an N-isopropylacrylamide monomer and water in a weight ratio of 87:13 to 95:5.

Since polyisopropylacrylamide having the weight ratio of an N-isopropylacrylamide monomer and water as described above includes a large amount of water, it is possible to implement a high actuation force and a fast actuation speed compared to those of a typical water responsive soft actuator.

In addition, the water responsive soft actuator according to the invention is characterized in that water is absorbed into an object of a first shape made of the water-absorbable polyisopropylacrylamide to allow the object of the first shape to be in an elastically deformable state, followed by applying external force to deform the object of the first shape into an object of a second shape, and drying the object of the second shape to maintain the second shape.

Figure 1:
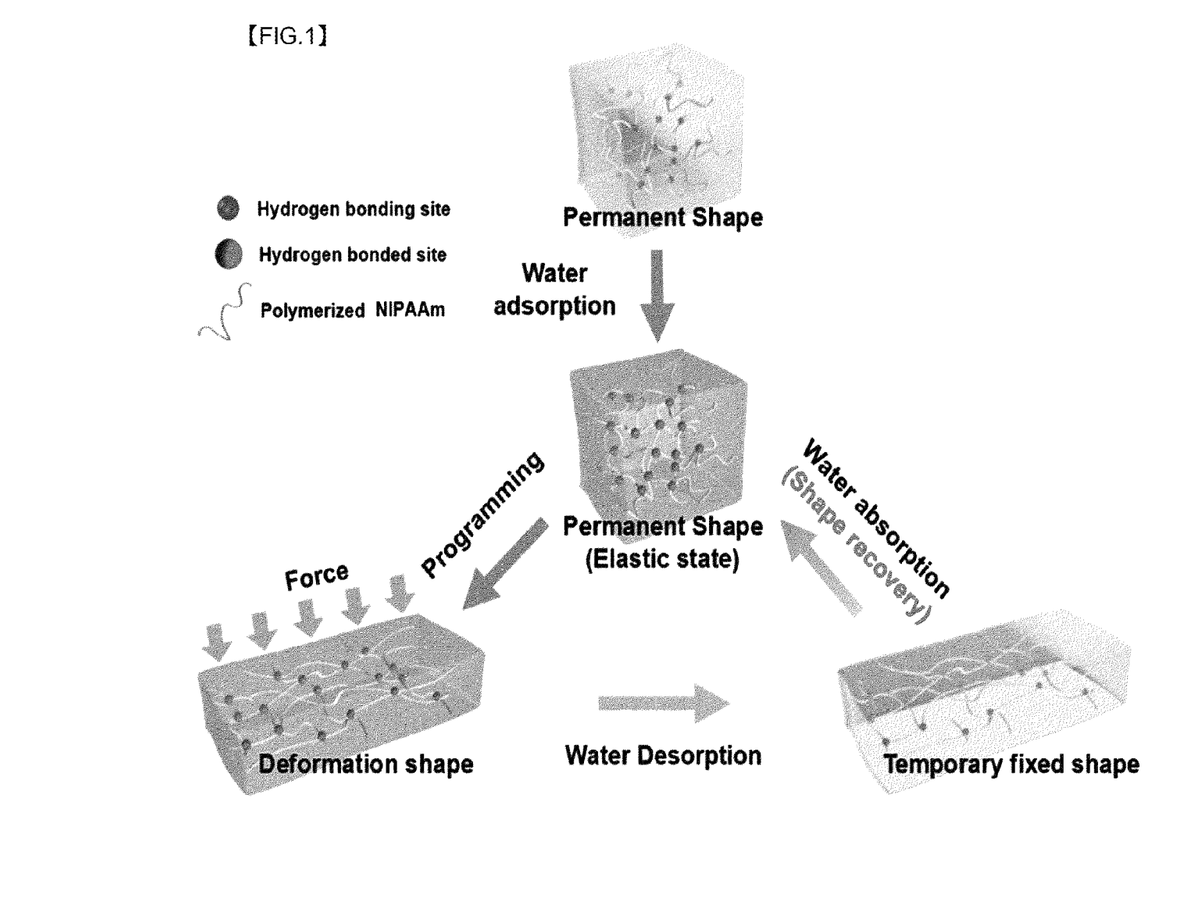
FIG. 1 schematically illustrates a method for driving a water responsive soft actuator according to an embodiment of the invention.

As illustrated in FIG. 1, when water is absorbed into the object of the first shape (permanent shape) in an initially molded state, the object becomes in a deformable state, and then external force is applied to deform the object from being in the first shape to be in the second shape, and the object is dried to maintain the deformed second shape. When the deformed second shape is placed in a wet environment, the object of the second shape absorbs water and causes a shape memory operation of returning to the first shape, through which the actuator operation is driven.

In the invention, the ⌈first shape⌋ is a shape including an initial state of being molded with water-absorbable polyisopropylacrylamide, and a state in which water is absorbed after molding. There may be a slight difference in dimensions between the initially molded state and the state in which water is absorbed after molding, but the appearances are substantially the same or extremely similar to each other, and thus, it is defined as the ⌈first shape⌋. In addition, the ⌈second shape⌋ is a shape including a state in which external force is applied to deform the ⌈first shape⌋ in which water is absorbed, and a dried state in the deformed state. As in the case of the ⌈first shape⌋, there may be a slight difference in dimensions between the state of being deformed while water is absorbed and the state in which at least some of the absorbed water has been removed by drying, but the appearances are substantially the same or extremely similar to each other, and thus, it is defined as the ⌈second shape⌋.

In addition, the water responsive soft actuator according to the invention may preferably have a Young's modulus of 1 MPa or greater.

A typical water responsive soft actuator has a low Young's modulus at a kPa level, and this is because if the Young's modulus is maintained high at 1 MPa or greater, the actuation force and actuation speed of a soft actuator may be improved.

In addition, the water responsive soft actuator according to the invention absorbs and releases water of preferably 0.05 to 5 mass % to be driven.

As described above, the water responsive soft actuator according to the invention absorbs and releases a small amount of water to be driven compared to the prior art.

In addition, the water responsive soft actuator according to the invention may preferably have an energy density of $10^4$ to $10^6$ J/m$^3$.

In addition, the water responsive soft actuator according to the invention may preferably have an actuation force of 0.01 to 5 N.

In the invention, an actuation speed is defined by the concept of frequency (s$^{-1}$), and is a value required to proceed with one cycle of shape recovery driven by water content.

In addition, the water responsive soft actuator according to the invention may further include a crosslinking agent and a photoinitiator.

A method for driving a water responsive soft actuator according to the invention is characterized by including (a) crosslinking N-isopropylacrylamide to make an object of a first shape including polyisopropylacrylamide, (b) allowing water to be absorbed into the object of the first shape to allow the object of the first shape to be in an elastically deformable state, (c) applying external force to the object of the first shape in an elastically deformable state to deform the object of the first shape into an object of a second shape, (d) drying the object of the second shape, and (e) allowing water to be absorbed into the dried object of the second shape to allow driving in the first shape.

That is, the driving of a water responsive soft actuator according to the invention is achieved through a shape memory operation in which water is absorbed in the deformed second shape to restore the first shape through Steps (a) to (e).

In addition, in the driving method of a water responsive soft actuator according to the invention, when N-isopropylacrylamide is crosslinked in Step (a) above, the amount of a crosslinking agent may be controlled to control actuation force in Step (d) above.

In addition, when making an object of a first shape in Step (a), a photoinitiator may be used.

In addition, in the driving method of a water responsive soft actuator according to the invention, the thickness of the first shape may be controlled to control the actuation force of Step (d).

In addition, in the driving method of a water responsive soft actuator according to the invention, Step (a) may include preparing a composition including an N-isopropylacrylamide aqueous solution, a crosslinking agent, and a photoinitiator, and filling a mold with the composition, and irradiating the composition with ultraviolet rays to cross-link the N-isopropylacrylamide, thereby forming polyisopropylacrylamide.

The crosslinking agent may be added in a range of 0.1 to 7 mass % in a composition including an N-isopropylacrylamide aqueous solution, a crosslinking agent, and a photoinitiator, and more preferably, the addition amount of the crosslinking agent is 0.5 to 5 mass %. When the addition amount of the crosslinking agent is less than 0.1 mass %, crosslinking is not sufficiently achieved, and when greater than 7 mass %, crosslinking is excessively achieved, so that it is difficult to drive a soft actuator desired in the invention, and thus, it is preferable that the crosslinking agent is added in the above range.

The crosslinking agent may be, for example, one, or a mixture or two or more selected from the group consisting of example, N,N-methylenebisacrylamide, diethylene glycol diacrylate, dimethacrylate, ethylene glycol diacrylate, dimethacrylate, tetra(ethylene glycol)diacrylate, 1,6-hexanediol acrylate, divinylbenzene, trimethylolpropane triacrylate, poly(ethylene glycol)diacrylate, and acrylamidobenzophenone, but is not particularly limited thereto. Preferably, the crosslinking agent may be N,N-methylenebisacrylamide.

The photoinitiator may be added in a range of 0.01 to 2 mass % in a composition including an N-isopropylacrylamide aqueous solution, a crosslinking agent, and a photoinitiator, and more preferably, the addition amount of the photoinitiator is 0.05 to 1 mass %.

The photoinitiator may be, for example, 2-hydroxyl-1-[4-(2-hydroxyethoxy)phenyl]-2-methylpropan-1-one, but is not particularly limited thereto.

Example 1

Manufacturing of Water Responsive Soft Actuator

A water responsive soft actuator was manufactured by mixing 10 g of a monomer aqueous solution in which the weight ratio of N-isopropylacrylamide to water is 87:13 to 95:5, 0.1 g of N,N-methylenebisacrylamide as a crosslinking agent, 0.005 g of 2-hydroxyl-1-[4-(2-hydroxyethoxy)phenyl]-2-methylpropan-1-one as a photoinitiator, and then filling the mixture in a poly(dimethylsiloxane) (PDMS) mold, followed by performing 1800 W ($\lambda$=365 nm) UV photopolymerization.

Figure 2:
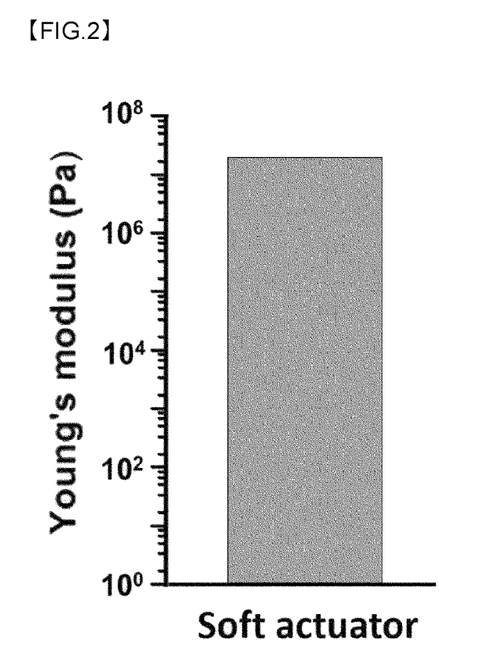
FIG. 2 shows the result of measuring the Young's modulus of a water responsive soft actuator manufactured according to an embodiment of the invention.

FIG. 2 shows the result of measuring the Young's modulus of a water responsive soft actuator manufactured according to an embodiment of the invention.

As shown in FIG. 2, the water responsive soft actuator manufactured according to an embodiment of the invention exhibited a Young's modulus value of 10 MPa or greater.

Figure 3:
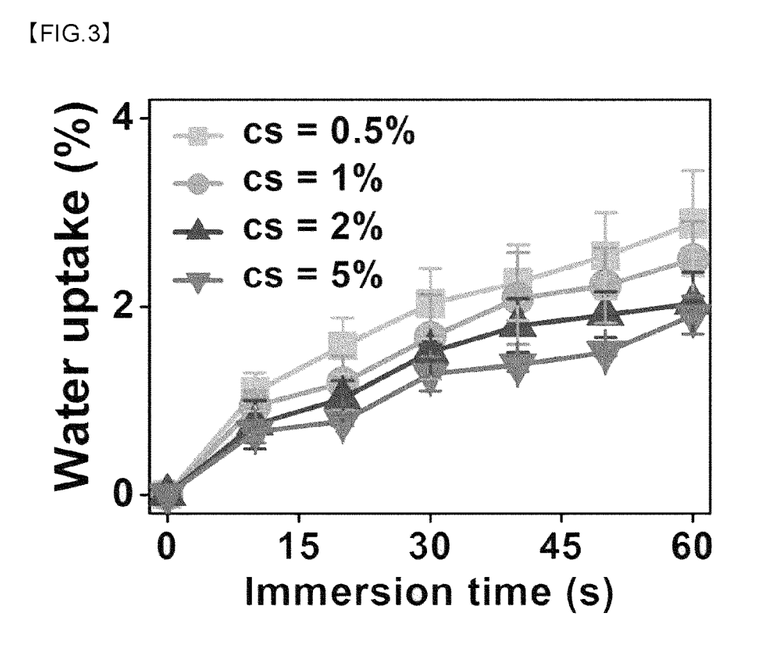
FIG. 3 shows the result of measuring a water absorption amount according to immersion time after molding according to an amount of a crosslinking agent (CS) added.

FIG. 3 shows the result of measuring a water absorption amount according to immersion time after molding according to an amount of a crosslinking agent (CS) added.

As shown in FIG. 3, the water responsive soft actuator manufactured according to an embodiment of the invention tends to have a decreased amount of absorbed water as the amount of crosslinking agent (CS) added is increased and the immersion time is decreased, and it can be seen that the absorption and release of water are performed within a range of approximately 0.05 to 5%.

Figure 4:
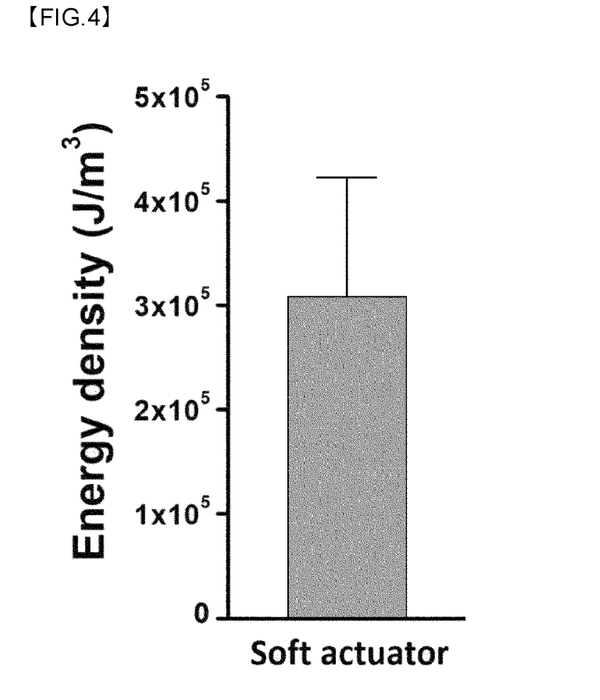
FIG. 4 shows the result of measuring the energy density (J/m$^3$) of a water responsive soft actuator manufactured according to an embodiment of the invention.

FIG. 4 shows the result of measuring the energy density ($J/m^3$) of a water responsive soft actuator manufactured according to an embodiment of the invention.

As shown in FIG. 4, the water responsive soft actuator manufactured according to an embodiment of the invention has an energy density ($J/m^3$) in an energy density range of $10^4$ to $10^6$ $J/m^3$.

Figure 5:
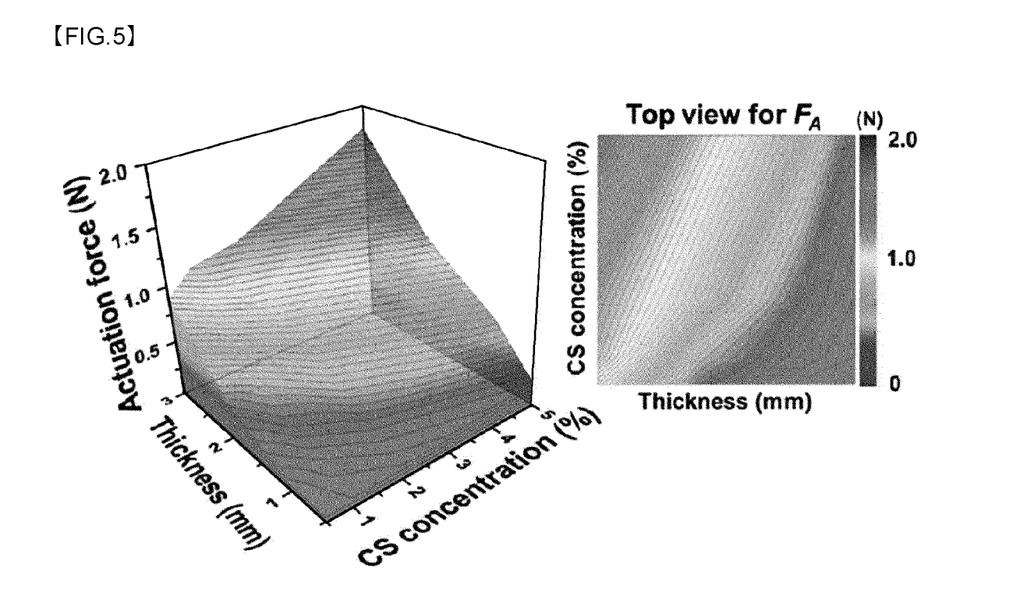
FIG. 5 shows the result of measuring an actuation force according to the thickness of a water responsive soft actuator manufactured according to an embodiment of the invention and the concentration of a crosslinking agent.

FIG. 5 shows the result of measuring an actuation force according to the thickness of a water responsive soft actuator manufactured according to an embodiment of the invention and the concentration of a crosslinking agent.

As shown in FIG. 5, the water responsive soft actuator manufactured according to an embodiment of the invention may have different actuation force depending on the content of a cross-linking agent and a thickness, and it has been confirmed that the soft actuator may have an actuation force of up to 2 N. It has been confirmed that when the manufactured water responsive soft actuator is driven in a harmonized motion in a specific robot, the actuation force of the actuator is increased to implement an actuation force at a 5 N level.

Figure 6:
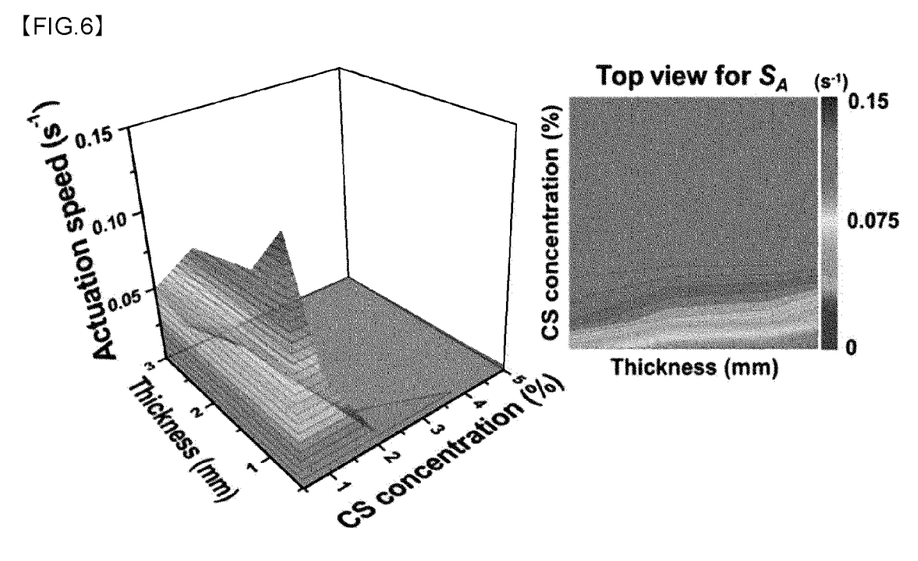
FIG. 6 shows the result of measuring an actuation speed according to the thickness of a water responsive soft actuator manufactured according to an embodiment of the invention and the concentration of a crosslinking agent.

FIG. 6 shows the result of measuring an actuation speed according to the thickness of a water responsive soft actuator manufactured according to an embodiment of the invention and the concentration of a crosslinking agent.

As shown in FIG. 6, the soft actuator according to an embodiment of the invention may have an actuation speed in the range of 0.01 to 5 $s^{-1}$.

Figure 7:
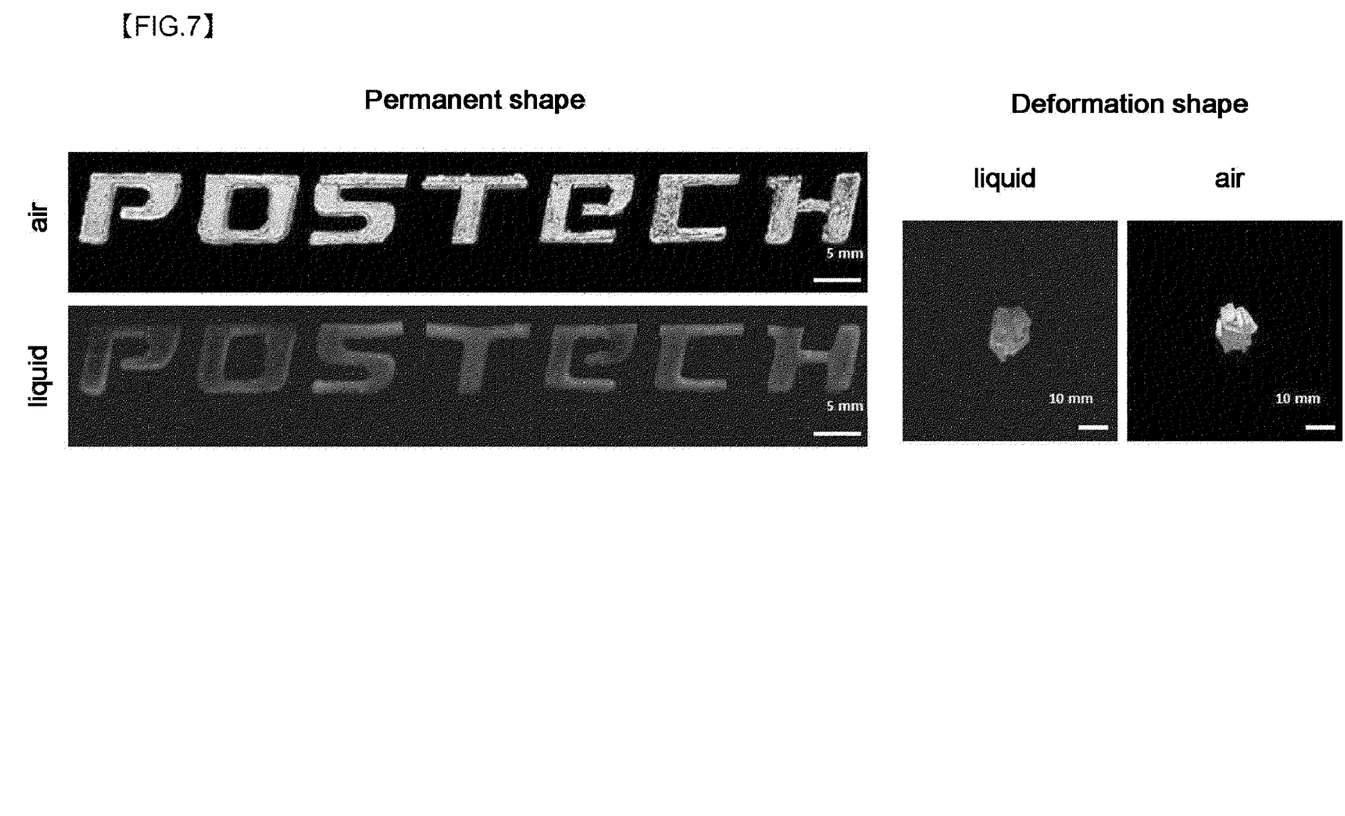
FIG. 7 shows a first shape (permanent shape) in a molded state and in a state in which water is absorbed and a second shape (deformation shape) in which water is absorbed and in a dried state.

FIG. 7 shows a first shape (permanent shape) in a molded state and in a state in which water is absorbed and a second shape (deformation shape) in which water is absorbed and in a dried state.

As confirmed in FIG. 7, the first shape represented by the permanent shape formed by the soft actuator according to an embodiment of the invention has no substantial differences in appearance between an initial molded state (indicated by "air") and a state in which water is absorbed in the molded state (indicated by "liquid"). In addition, the second shape represented by the deformation state may have a slight difference in dimensions between a state of being deformed while water is absorbed (indicated by "liquid") and a state in which water is dried (indicated by "air"), but it can be seen that there are substantial differences in appearance.

Example 2

Example of Application to Grab Soft Robot

For the application to a grab soft robot, four different water responsive soft actuators having an actuation force of 1 N were manufactured. The actuation force was generated when a water responsive soft actuator (thickness 2 mm, width 15 mm, height 20 mm) contained a photoinitiator of 5%, and the four different water responsive soft actuators manufactured to grab a desired soft material were combined into a cross form through UV photopolymerization, and were finally manufactured as a grab soft robot having an actuation force of 4 N.

Figure 8:
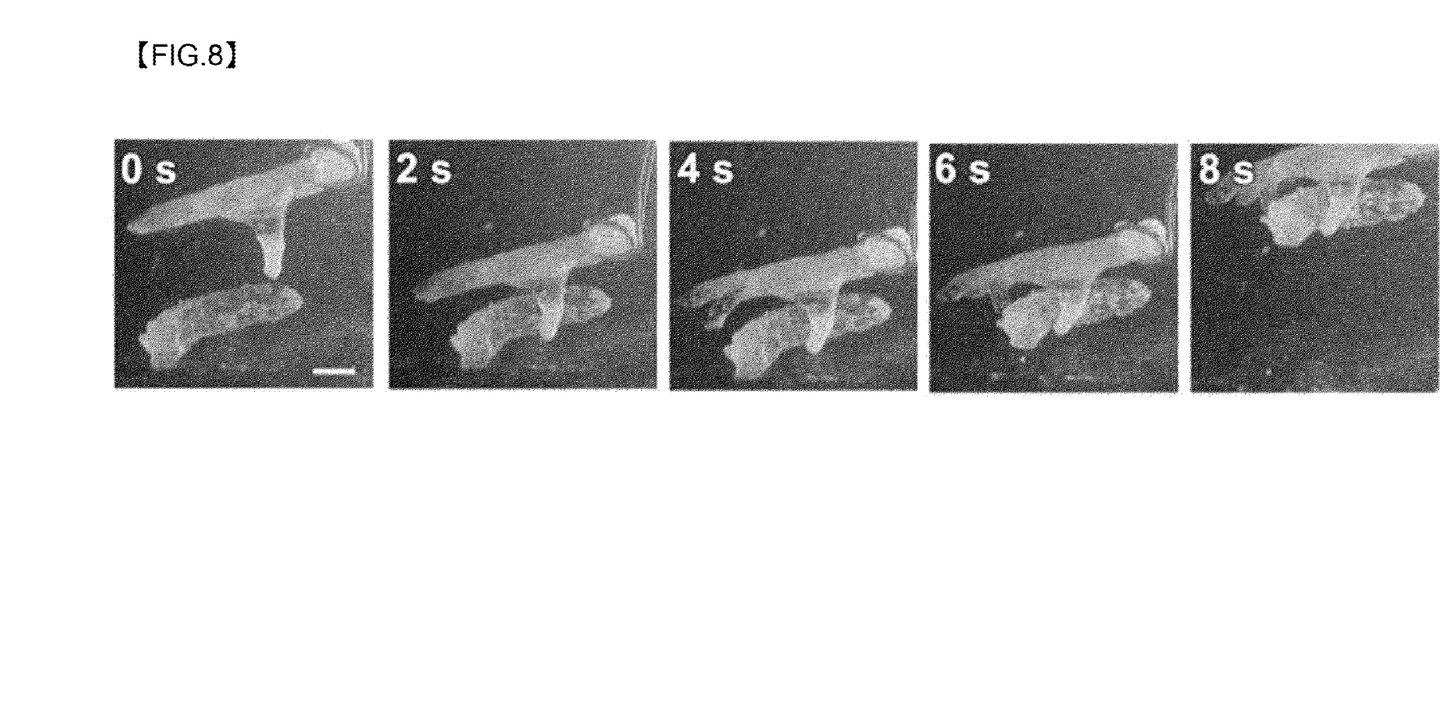
FIG. 8 shows real-time images of a water responsive soft actuator according to an embodiment of the invention which is applied to a soft robot capable of grabbing a soft object.

The actuation speed of the grab soft robot manufactured through the above was measured at a 0.1 $s^{-1}$ level. The operation of a grab soft robot to which the soft actuator according to Example 2 was applied is shown in FIG. 8. The results of FIG. 8 were captured by time lapse (frame: 2 s), and it is confirmed that a soft grab operation is performed at a speed faster than that of the prior art.

Example 3

Example of Application to Suture Soft Robot

For the application to a suture soft robot, three different water responsive soft actuators having an actuation force of 0.06 N were manufactured. The actuation force was generated when a water responsive soft actuator (length 10 mm, width 4 mm, thickness 1 mm) contained a photoinitiator of 0.5%, and the three different water responsive soft actuators manufactured to effectively suture a wound gap (10 mm×60 mm) were attached to the wound gap at intervals of 40 mm.

Figure 9:
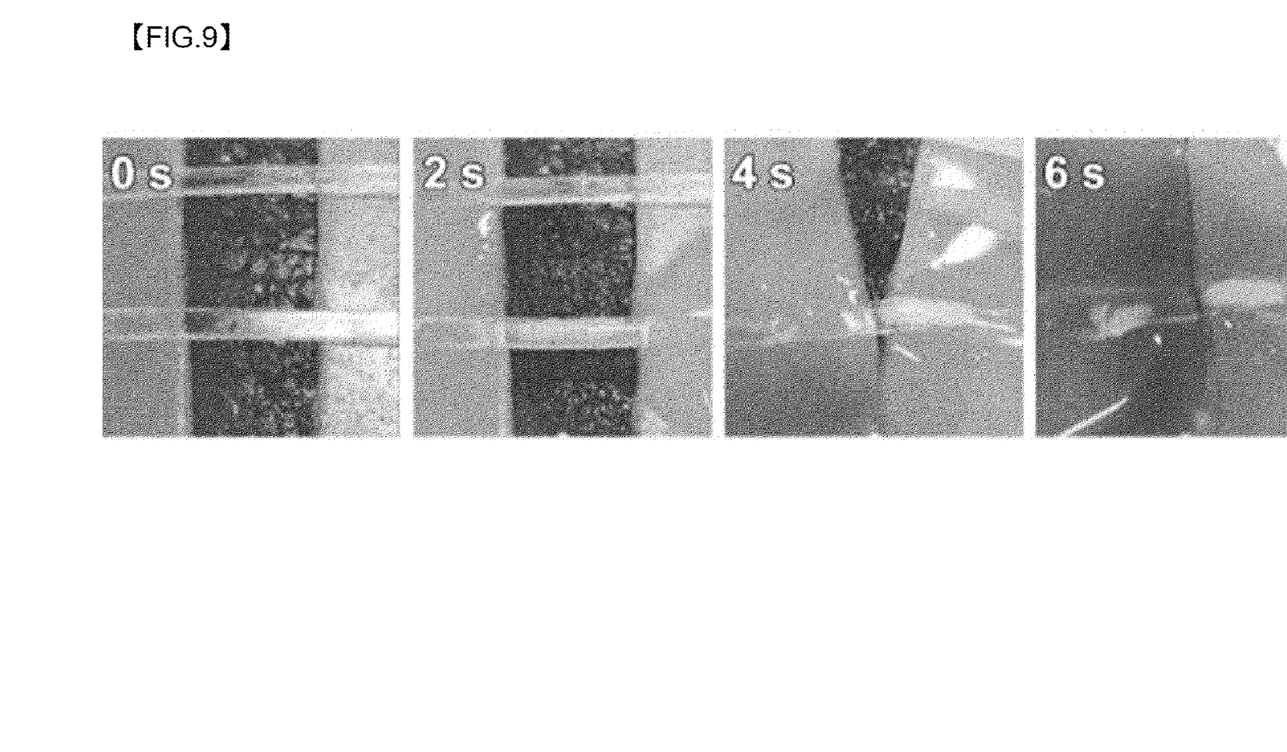
FIG. 9 shows real-time images of a water responsive soft actuator according to an embodiment of the invention which is applied to a soft robot capable of suturing a wound.

An actuation force of 0.18 N of the suture soft actuator manufactured as described above was allowed to be achieved at an actuation speed at a 0.17 $s^{-1}$ level. The operation of a suture soft robot to which the soft actuator according to Example 3 was applied is shown in FIG. 9. The results of FIG. 9 were captured by time lapse (frame: 2 s), and it is confirmed that a suture operation is performed quickly and reliably.

What is claimed is:

1. A water responsive soft actuator comprising water-absorbable polyisopropylacrylamide,
wherein the water responsive soft actuator is driven by water absorption of the polyisopropylacrylamide, and
wherein the polyisopropylacrylamide has a structure comprising crosslinked N-isopropylacrylamide, the structure corresponding to synthesis from an aqueous solution comprising N-isopropylacrylamide monomer and water in a weight ratio of 187:13 to 95:5.

2. The water responsive soft actuator of claim 1, wherein the soft actuator comprising the polyisopropylacrylamide has a Young's modulus of 1 MPa or greater.

3. The water responsive soft actuator of claim 1, wherein the water responsive soft actuator is driven through a water absorption/release rate of 0.05 to 5%.

4. The water responsive soft actuator of claim 1, wherein the water responsive soft actuator has an energy density of $10^4$ to $10^6$ J/m$^3$.

5. The water responsive soft actuator of claim 1, wherein the water responsive soft actuator has an actuation force of 0.01 to 5 N.

6. The water responsive soft actuator of claim 1, wherein the water responsive soft actuator has an actuation speed of 0.01 to 5 s$^{-1}$.

7. A method for driving a water responsive soft actuator, the method comprising:
(a) crosslinking N-isopropylacrylamide to make an object of a first shape including polyisopropylacrylamide;
(b) allowing water to be absorbed into the object of the first shape to allow the object of the first shape to be in an elastically deformable state;
(c) applying external force to the object of the first shape in an elastically deformable state to deform the object of the first shape into an object of a second shape;
(d) drying the object of the second shape; and
(e) allowing water to be absorbed into the dried object of the second shape to allow driving in the first shape;

wherein Step (a) above comprises:
preparing a composition including an N-isopropylacrylamide aqueous solution, a crosslinking agent, and a photoinitiator, and filling a mold with the composition; and
irradiating the composition with ultraviolet rays to crosslink the N-isoprobylacrylamide, thereby forming polyisopropylacrylamide, and
wherein a weight ratio of N-isopropylacrylamide monomer to water of the N-isopropylacrylamide aqueous solution is 87:13 to 95:5.

8. The method of claim 7, wherein when N-isopropylacrylamide is crosslinked in Step (a) above, the amount of a crosslinking agent is controlled to control actuation force in Step (d) above.

9. The method of claim 7, wherein the thickness of the first shape is controlled to control the actuation force of Step (d).

10. The method of claim 7, wherein the photoinitiator is 2-hydroxyl-1-[4-(2-hydroxyethoxy)phenyl]2-methylpropan-1-one.

11. The method of claim 7, wherein the crosslinking agent is one, or a mixture or two or more selected from the group consisting of N,N-methylenebisacrylamide, diethylene glycol diacrylate, dimethacrylate, ethylene glycol diacrylate, dimethacrylate, tetra(ethylene glycol)diacrylate, 1,6-hexanediol acrylate, divinylbenzene, trimethylolpropane triacrylate, poly(ethylene glycol)diacrylate, and acrylamidobenzophenone.

* * * * *